United States Patent Office 2,996,466
Patented Aug. 15, 1961

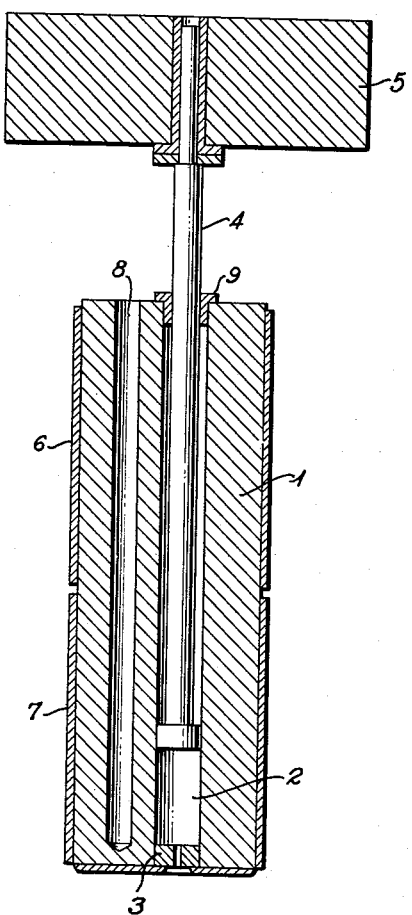

2,996,466
PROCESS FOR PREPARING EXTRUDED HIGH MOLECULAR WEIGHT SUBSTANCES AND THE RESULTING PRODUCTS
Jacob Christoffel Ferdinand Kessler, Velp, Arnhem, and Harm Roelf Spreeuwers, Arnhem, Netherlands, assignors to N.V. Onderzoekingsinstituut Research, Arnhem, Netherlands, a corporation of the Netherlands
Filed Dec. 21, 1956, Ser. No. 629,973
Claims priority, application Netherlands Jan. 7, 1956
16 Claims. (Cl. 260—28)

This invention relates to the manufacture of shaped products, and especially self-supporting shaped products, from high molecular weight linear polycondensation products by means of extrusion. More particularly, the invention relates to the manufacture of self-supporting shaped products of the kind indicated other than threads and films, although the manufacture of threads and films is also contemplated as falling within the broad scope of the invention. This invention is in the nature of an improvement over the invention described and claimed in our prior copending U.S. application Serial No. 514,666, filed June 10, 1955, now Patent No. 2,959,570.

One of the principal objects of the present invention is to provide a new and improved method for the manufacture of self-supporting shaped products from high molecular weight linear polycondensation products by means of extrusion wherein the difficulties due to rapid changes in plasticity of these polymeric materials on melting is avoided, and wherein difficulties due to moisture are also avoided. A further object of the invention is to provide new and improved self-supporting shaped products that are prepared by extrusion of high molecular weight linear polycondensation products such as for example linear superpolyamides. In its more specific and preferred aspects, the invention has for its object the provision of new and improved self-supporting shaped products of the kind indicated, other than threads and films, which are characterized by desirable properties despite having been subjected to a moist environment at some point during their manufacture.

The manner in which these and other objects and features of the invention are attained will appear more fully from the following description thereof, in which reference is made to typical and preferred procedures in order to indicate more fully the nature of the invention, but without intending to limit the invention thereby.

The preparation of extrusion material on the basis of linear polycondensation products, in which a proportion of a substance, up to a maximum of 2% by weight of the polymer, is added to the polymer, which substance in that proportion thickens the polymer in molten condition to such an extent that the ratio between the flow rate of the unmixed polymer determined by means of the extrusion plastometer according to A.S.T.M. D 1238–52 T and the flow rate of this polymer mixed with the thickening agent amounts to at least 1.5, has already previously been proposed—see our prior copending application cited above.

The determination of flow rate is preferably carried out in an apparatus such as that shown in the accompanying drawing in longitudinal section.

This apparatus comprises a metal cylinder 1 having a length of 16.5 cm. and a diameter of 5 cm. in which a continuous cylindrical bore 2 having a diameter of 1 cm. is provided. In the lower portion of said bore a nozzle 3 having an orifice of 0.21 cm. is tightly fitted. The bore 2 also accommodates a plunger 4 whose weight is 0.1 kg., said plunger being adapted to move freely up and down within the bore. On this plunger a weight 5 of 2.06 kg. may be placed. The metal cylinder 1 is surrounded by two electric heating elements 6 and 7. A space 8 is provided in said cylinder for receiving a thermometer. The plunger 4 passes through a suitable packing gland 9.

When the determination is to be carried out, the metal cylinder 1 with the plunger 4 removed is first heated by means of the heating elements 6 and 7 to a temperature of 240° C., whereupon 7 gr. of the polymer to be tested are introduced into the bore 2 followed by the insertion of the plunger. The plunger is kept without a load on the polymer for 3 minutes, but from time to time it is pressed down to promote deaeration of the polymer. Thereupon the weight 5 is placed on the plunger. After two minutes this plunger should have sunk halfway down the bore. If necessary, an additional pressure is exerted on the plunger to bring it to this position. After passing this point the polymer is given 2 minutes to flow out freely. Thereafter the polymer stream is cut off along the nozzle whereupon during the next succeeding 3 minutes the polymer then flowing out is separately collected, weighed and converted to the quantity which would have flowed out during ten minutes. This amount expressed in grams is the flow rate.

As examples of substancs exercising the above-mentioned thickening influence there have been mentioned halogen-substituted or non halogen-substituted esters of a phosphoric acid or a phosphorous acid including alkyl phosphites, such as tributyl phosphite, diethyl phosphite and dibutyl phosphite, aryl phosphites, such as triphenyl phosphite, halogen-substituted or non halogen-substituted alkyl or aryl phosphates, such as diethyl-β-chloroethyl phosphate, phenyl-bis-p-chlorophenyl phosphate, trichloroethyl phosphate marketed under the name of Genomoll P, trichloropropyl phosphate, ethyl-bis-β-chloroethyl phosphate, trichloroethyl phosphite. Other substances that have been mentioned include bis-chloromethylene-m-xylene, polyallyl chloride, tetraethyl pyrophosphate, bis-(chloroethyl) sulphate, tri-n-butyl borate, p-xylylene dichloride, glycerol trichloro acetate, bis-bromo-methylene-m-xylene, p-bis (epoxypropyoxy) benzene, bis-β-chloroethyl vinylphosphate, 2.4-dimethylol phenol, 2.4-dimethylol-6-chlorophenol and terephthalic aldehyde. Also mixtures of these various substances were used.

All of these substances reduce the flow rate of the molten polymer and, at the said concentration of less than 2% by weight, they do not plasticize the polymer at room temperature.

The polycondensation products preferably used in this older process were obtained by polymerization of ε-caprolactam. Thereafter the polymerization product was washed to such an extent that the content of water-soluble low-molecular components remaining therein amounted to less than 4.5%.

In the polymerization process one generally used phosphoric acid or acetic acid as a stabilizer and the polymerization was carried out to such an extent that the specific viscosity of the final product, measured in a solution of 1% by weight in 90% by weight of formic acid, was in the range of 1.3 to 1.7.

Instead of these polyamides, however, those obtained from diamines and dicarboxylic acids also came into consideration for processing. Moreover, the well known polyurethanes could be similarly processed, such as those described e.g. in Rinke et al. U.S. Patent No. 2,511,544 and Catlin U.S. Patent No. 2,284,637.

Apart from single polycondensation products it was found that also copolycondensation products or mixtures of these various products were likewise suitable for processing.

Mixing of the polymer and the thickening agent could be effected in various ways. Thus, it was possible to mix the substances prior to supplying them to the extrusion device. According to a preferred embodiment polymer granules were rolled for a short time, for example for about 30 seconds, with the required proportion of the thickening agent. In this way the polymer granules were covered with a thin layer of the thickening agent and an extrusion material was obtained which could be processed in any known extrusion machine.

It was also possible to add the thickening agent during the charging of the polymer to the extruding apparatus so that the desired mixture was obtained during flow through the extruding apparatus.

When carrying out these processes in practice it was found that often the mixture of the polycondensation product and the thickening agent did not maintain during extrusion the shape given to it by the extrusion die.

It was, surprisingly, found that the moisture content of the extrusion material was of decisive importance in connection with the extrudability. Only if the moisture content of the material to be extruded does not exceed a predetermined value, namely about 0.1% by weight, is the form-stability of the strand extruded by the extrusion die strictly ensured.

According to the present invention, an extrusion material is obtained which even on continued exposure to a moist atmosphere keeps its extrudability. This is effected by rolling the polymers in granular form, having a maximum moisture content of 0.1% by weight, with molten paraffin wax having a melting point of at least 30° C., and preferably up to about 100° C., and with the thickening agent, after which the paraffin wax layer on the coated granules is made to solidify.

In the case of polymer granules produced in this way the paraffin wax layer prevents the absorption of moisture.

An additional advantage of this method is the fact that liquid thickening agents are retained so well on the polymer granules by means of the paraffin wax layer that dry granules are obtained. By reason of this feature according to the present invention a de-mixing of the polymer granules and the thickening agents, as might otherwise occur if, after the mixing of these substances, the mixture were kept stored for a long time and then had to be shipped, cannot take place; in other words, a permanent satisfactory distribution of the thickening agent on the polymer granules is assured when proceeding in accordance with the present invention. This offers the possibility of applying the thickening agent on the granules long before they are processed, and therefore, for example, immediately after the manufacturing process by which the polymer granules are initially prepared.

It is generally preferred to roll the polymer granules first with the paraffin wax and only thereafter with the thickening agent. In this way a better adhesion of the paraffin wax and the thickening agent to the granules is achieved.

In order to be sure of a product with a uniform moisture content, it is preferred to roll the granules with the paraffin wax and with the thickening agent while maintaining the moisture content at a value of maximum 0.1% by weight.

In preparing extrusion material on the basis of polycaprolactam it is preferred as a result of economic considerations to use the embodiment in which, according to the present invention, granules of a polyamide, which has been obtained by polymerization of ε-caprolactam and the monomer content of which has been reduced by washing with water to a value of less than 4.5% by weight, are dried at a temperature of 100° C. while being subjected to a reduced pressure and to rolling, the dried granules are immediately thereafter rolled in the drier successively with the paraffin wax added in liquid condition and with the thickening agent while maintaining the same conditions as those during drying, whereupon also during rolling the paraffin wax layer on the coated granules is allowed to solidify.

In carrying out the process according to the present invention various kinds of paraffin wax may be used; it is only necessary that their melting points be higher than room temperature so that at that temperature the polymer granules do not stick together. However, paraffin wax having a melting point above 60° C. is to be preferred because on being extruded this paraffin wax does not liquefy too soon. Melting points up to about 100° C. are in general satisfactory.

It is preferred to use the paraffin wax in a proportion of 0.7% by weight relative to the polymer. When using such a proportion of paraffin wax a sufficiently thick coating is obtained on the polymer granules to prevent absorption of moisture and to keep the thickening agent on the granules. However, the weight of paraffin wax may vary over a considerable range, such as from 0.05 to 1.5% by weight relative to the polymer.

In order to indicate still more fully the nature of the present invention, the following examples of typical procedures are set forth, it being understood, however, that this description is presented by way of illustration only, and not as limiting the scope of the invention. Parts are by weight unless indicated otherwise by the context.

*Example I*

Granules of a polyamide having a specific viscosity of 1.5, formed from the polymerization product of ε-caprolactam obtained by polymerization in the presence of 0.1% by weight of phosphoric acid as a stabilizer, said granules containing about 2% by weight of water-soluble components and 0.05% of moisture, were rolled for 1 hour at 100° C. with 0.7% by weight of paraffin wax having a melting point of about 85° C. Thereupon 0.5% by weight of tributyl phosphite, calculated on the weight of the polymer, was added whereupon rolling was continued for another 15 minutes at the same temperature. Thereafter the granules were cooled while being further subjected to rolling. As soon as the temperature had decreased to 75° C., rolling was stopped.

It was found that in the cooled granules the tributyl phosphite had been dissolved into the solid paraffin wax layer.

The granules thus obtained were supplied to a Reifenhauser extruder. With this extruder it is possible to extrude horizontally into the atmosphere and to withdraw the product formed, namely a tube having a diameter of 25 mm. and a wall thickness of 2 mm., in the known manner by means of a draw-off device. The temperature of the extruder was kept at 260° C.

The extruded tube had a smooth surface and a circular cross-section.

The same results were obtained when the polymer granules, prior to being processed, had been exposed for a considerable time to a moist atmosphere.

*Example II*

Granules of a polyamide having a specific viscosity of 1.4, formed from the polymerization product of ε-caprolactam obtained by polymerization in the presence of 0.1% by weight of phosphoric acid as a stabilizer, were washed with hot water until they contained only 3% by weight of water-soluble components and were thereupon dried in a drum type drier for 34 hours at 100° C. under reduced pressure while being rolled. On determination of the moisture content of the polymer granules this was found to be 0.02%.

Thereupon 0.7% by weight of molten paraffin wax having a melting point of 60° C. was introduced into the drum and rolling was continued for 1 hour at 100° C. under a reduced pressure.

Then 0.3% by weight of trichloroethyl phosphate was added, whereupon rolling was continued for 1 hour under the same conditions.

Subsequently the mixture was cooled, the drier being rotated under the maintained reduced pressure until the temperature had decreased to 50° C.

These granules had the same favorable properties as the granules described in Example I.

*Example III*

Granules of a polyamide having a specific viscosity of 1.1 and a moisture content of 0.1% by weight, formed by polycondensation of hexamethylene diamine and adipic acid, were rolled for 1 hour at 100° C. with 0.7% by weight of paraffin wax having a melting point of 85° C. Subsequently 0.5% by weight of tributyl phosphite, calculated on the weight of the polymer, was added, whereupon rolling was continued for 15 minutes at the same temperature. Thereafter the granules were cooled, the rolling being continued until the temperature had been reduced to 75° C.

Also after having been exposed for a considerable time to a moist atmosphere the granules thus obtained could still be extruded in a Reifenhauser extruder to smooth cylindrical tubes. During the manufacture of the tubes the temperature of the extruder was maintained at 290° C.

*Example IV*

Granules of polyethylene terephthalate having a specific viscosity of 0.65 and a moisture content of 1% by weight were dried in a stream of hot air until the moisture content amounted to 0.003% by weight. Subsequently the granules were rolled for 1 hour at 100° C. with 0.7% by weight of molten paraffin wax having a melting point of 85° C., whereupon 0.3% by weight of trichloroethyl phosphite was added and rolling was continued for 1 hour at the same temperature. Thereafter the mixture was cooled, the rolling being terminated as soon as the temperature had decreased to 75° C.

The granules thus obtained, which were only very slightly sensitive to the influence of moisture, could be extruded without difficulties to smooth tubes at a temperature of 295° C.

For the sake of completeness it should be stated that wherever in this specification and claims paraffin wax is mentioned this includes besides paraffin wax also similar waxy substances, such as natural and synthetic waxes, stearic acid and the like.

While specific examples embodying the present invention have been described above, it will be apparent that many changes and modifications may be made in the methods of procedure and in ingredients recited without departing from the true spirit of the invention. It will therefore be understood that the examples cited and the particular proportions, ingredients and methods set forth above are intended to be illustrative only, and are not intended to limit the scope of the invention.

What is claimed is:

1. In a process for the preparation of extrusion material on the basis of high molecular weight linear polycondensation polymers selected from the class consisting of polyamides and polyurethanes, said polyamides having the structural unit

in the main chain of the polymer and said polyurethanes having the structural unit

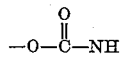

in the main chain of the polymer in which a proportion of a substance up to a maximum of 2% by weight is added as a high temperature thickening agent to those polymers, which substance in that proportion thickens the polymer in molten condition to such an extent that the ratio between the flow rate of the unmixed polymer determined by means of the extrusion plastometer according to A.S.T.M. D 1238–52 T and the flow rate of the polymer mixed with the thickening agent amounts to at least 1.5, and which substance is selected from the group consisting of esters of phosphoric acid, halogen-substituted esters of phosphoric acid, esters of phosphorous acid, halogen-substituted esters of phosphorus acid, bis-chloromethylene-m-xylene, polyallyl chloride, tetra-ethyl pyrophosphate, bis-(chloroethyl) sulphate, tri-n-butyl borate, p-xylylene dichloride, glycerol trichloro acetate, bis-bromo-methylene-m-xylene, p-bis(epoxypropoxy) benzene, bis-β-chloro-ethyl vinylphosphate, 2.4-dimethylol phenol, 2.4-dimethyl-6-chlorophenol and terephthalic aldehyde, the improvement comprising contacting the polymer in granular form, and having a maximum moisture content of 0.1% by weight, with molten paraffin wax having a melting point of at least 30° C. and with the thickening agent, the wax being employed in an amount of at least 0.05% by weight of the polymer, and thereafter solidifying the paraffin wax layer on the coated granules.

2. A process according to claim 1 wherein the polymer granules are first contacted with the paraffin wax and thereafter with the thickening agent.

3. A process according to claim 2, wherein the contacting of the polymer granules with the paraffin wax and with the thickening agent is carried out while maintaining the moisture content at a maximum of about 0.1% by weight.

4. A process according to claim 1, wherein the melting point of the paraffin wax is between approximately 30° and 100° C.

5. A process according to claim 1, wherein the paraffin wax is employed to an extent of approximately 0.05 to 1.5% by weight of the polymer.

6. A process according to claim 1, wherein the paraffin wax is employed to an extent of approximately 0.7% by weight of the polymer.

7. A process for the preparation of extrusion material comprising a granular polymer of ε-caprolactam the monomer content of which has been reduced by washing with water to a value of less than 4.5% by weight, comprising drying the polymer granules to a moisture content of not more than about 0.1% by weight while subjecting same to a reduced pressure and to rolling, rolling the dried granules immediately thereafter in the drier successively with molten paraffin wax having a melting point of at least 30° C. and with a high temperature thickening agent, as hereinafter defined, while maintaining the same conditions as those prevailing during drying, the wax being employed in an amount of at least 0.05% by weight of the polymer, and thereafter while continuing the rolling causing the paraffin wax layer on the coated polymer granules to solidify, said thickening agent being a substance which when added to the polymer in a proportion up to a maximum of 2% by weight of the polymer thickens the polymer in molten condition to such an extent that the ratio between the flow rate of the unmixed polymer determined by means of the extrusion plastometer according to A.S.T.M. D 1238–52 T and the flow rate of the polymer mixed with the thickening agent amounts to at least 1.5, and said thickening agent being selected from the group consisting of esters of phosphoric acid, halogen-substituted esters of phosphoric acid, esters of phosphorous acid, halogen-substituted esters of phosphorous acid, bis-chloromethylene-m-xylene, polyallyl chloride, tetra-ethyl pyrophosphate, bis-(chloroethyl) sulphate, tri-n-butyl borate, p-xylylene dichloride, glycerol trichloro acetate, bis-bromo-methylene-m-xylene, p-bis (epoxypropoyxy)benzene, bis-β-chloroethyl vinylphosphate, 2.4-dimethylol phenol, 2.4-dimethyl-ol-6-chlorophenol and terephthalic aldehyde.

8. A process according to claim 7, wherein the polymer granules are first contacted with the paraffin wax and thereafter with the thickening agent.

9. A process according to claim 8, wherein the contacting of the polymer granules with the paraffin wax and with the thickening agent is carried out while maintaining the moisture content at a maximum of about 0.1% by weight.

10. A process according to claim 7, wherein the melting point of the paraffin wax is between approximately 30° and 100° C.

11. A process according to claim 7, wherein the paraffin wax is employed to an extent of approximately 0.05 to 1.5% by weight of the polymer.

12. A process according to claim 7, wherein the paraffin wax is employed to an extent of approximately 0.7% by weight of the polymer.

13. Granular extrusion material obtained according to the process described in claim 1.

14. Granular extrusion material obtained according to the process described in claim 7.

15. Formed objects manufactured with the extrusion material prepared according to the process described in claim 1.

16. Formed objects manufactured with the extrusion material prepared according to the process described in claim 7.

References Cited in the file of this patent

UNITED STATES PATENTS

| | | |
|---|---|---|
| 2,137,636 | Barrett | Nov. 22, 1938 |
| 2,249,686 | Dykstra | July 15, 1941 |
| 2,309,729 | Gordon | Feb. 2, 1943 |
| 2,358,963 | Davies | Sept. 26, 1944 |
| 2,729,618 | Muller et al. | Jan. 3, 1956 |

UNITED STATES PATENT OFFICE
CERTIFICATION OF CORRECTION

Patent No. 2,996,466            August 15, 1961

Jacob Christoffel Ferdinand Kessler et al.

It is hereby certified that error appears in the above numbered patent requiring correction and that the said Letters Patent should read as corrected below.

Column 6, line 11, for "-dimethyl-" read -- -dimethylol- --.

Signed and sealed this 24th day of April 1962.

(SEAL)
Attest:

ESTON G. JOHNSON
Attesting Officer

DAVID L. LADD
Commissioner of Patents